G. CHRISTESON.
RECORD BOOK.
APPLICATION FILED DEC. 21, 1914.
1,197,183.                                      Patented Sept. 5, 1916.
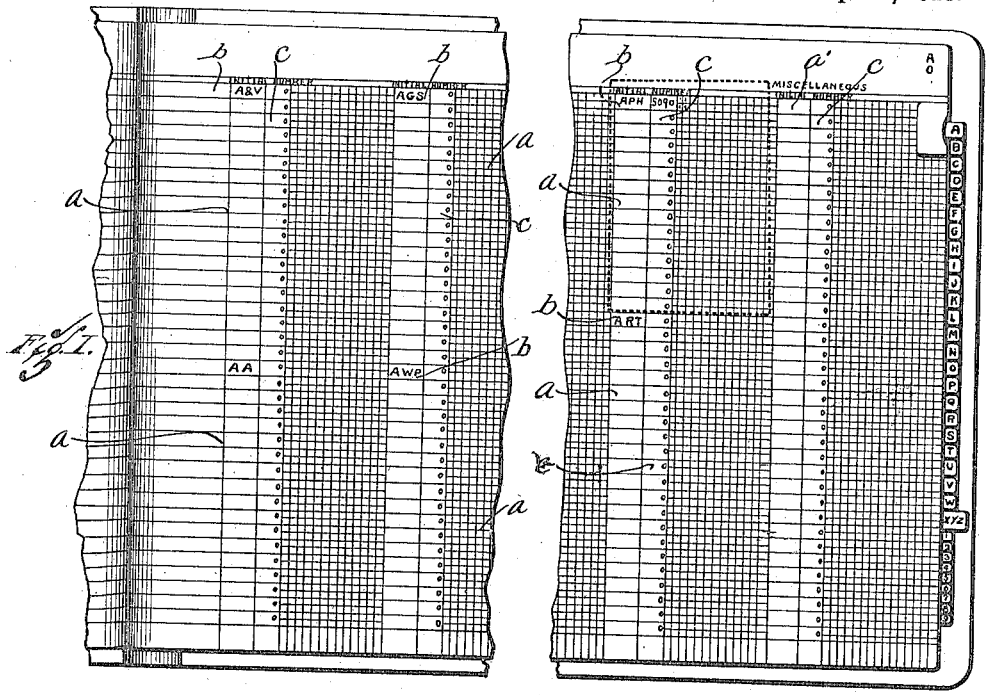
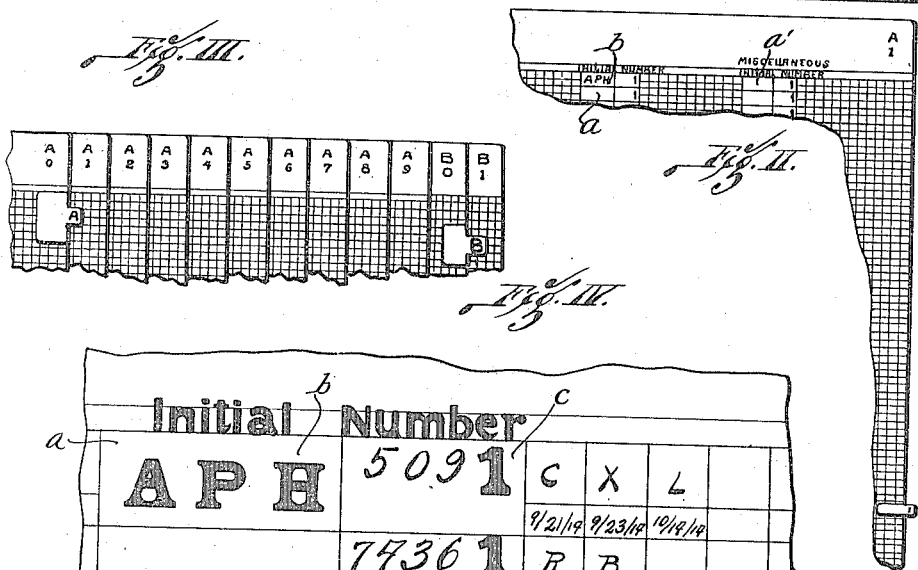
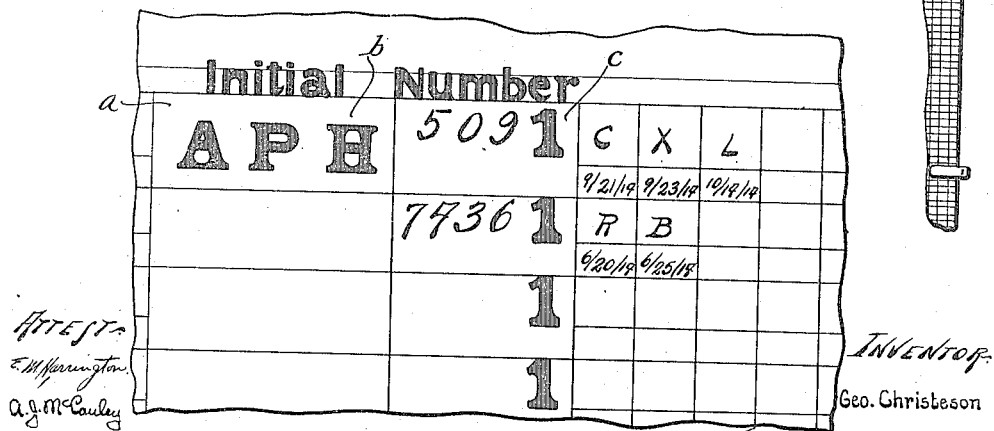

UNITED STATES PATENT OFFICE.

GEORGE CHRISTESON, OF ST. LOUIS, MISSOURI.

RECORD-BOOK.

1,197,183.     Specification of Letters Patent.     Patented Sept. 5, 1916.

Application filed December 21, 1914. Serial No. 878,356.

*To all whom it may concern:*

Be it known that I, GEORGE CHRISTESON, a citizen of the United States of America, a resident of the city of St. Louis, State of Missouri, have invented certain new and useful Improvements in Record-Books, of which the following is a full, clear, and exact description, reference being had to the accompanying drawings, forming a part of this specification.

My invention relates to a record book particularly adapted for use in recording the movements of railway cars.

Railroad companies are constantly receiving and delivering cars owned by foreign roads and the different companies keep a record of the receipt and disposal of the foreign cars which have been received from one foreign road and delivered to another. Such records usually show the car number, the name of the car owner, the name of the railroad company from which the car was received, the name of the company to whom the car was delivered, and the date of receipt and delivery. Since each railroad company receives and delivers cars owned by many other railroads, the records include the names of a very large number of foreign roads together with many car numbers, and such records have heretofore consisted of a complex collection of names and numbers arranged in a somewhat disorderly manner so that it has been quite difficult to find the record of a particular car owned by a particular company. In practice the records must be searched very frequently for the purpose of finding a brief history of the movements of a particular car, and also to find the proper place for making an entry relating to a particular car.

The object of my invention is to produce a record book which is divided and subdivided in a specific manner so that the clerk in making an entry relating to a particular car can readily turn to the proper subdivision or section wherein such entry must be made. Although the record book includes a brief history of many different cars owned by many different railroads, the history of any one of these cars may be found almost instantly, and this is a very important advantage for the reason that such information is very frequently required. A further advantage is that the different book elements are so arranged that the complex collection of names and numbers is divided and subdivided into an extremely simple and orderly arrangement of columns and headings which are so plain that the clerk is not liable to make a mistake in selecting the point at which the entry must be made.

Figure I is a top or plan view, partly broken away, of the record book embodying the features of my invention, the book being shown in its open position. Fig. II is a fragmentary detail view of one of the pages of the book. Fig. III is a fragmentary detail view showing the upper right hand corners of a number of pages. Fig. IV is an enlarged detail view showing a portion of one of the entry sections.

The book comprises a series of loose leaves or pages arranged in main alphabetical divisions, these main divisions being indicated by tabs bearing the characters of the alphabet, as shown most clearly in Fig. I and Fig. III.

Each alphabetical division comprises ten subdivisions designated 0 to 9, inclusive. The alphabetical division A as shown most clearly in Fig. III consists of a series of pages, the first being designated A0 and the last page being designated A9. I will term these ten pages subdivisions of the alphabetical division A, and it is to be understood that each alphabetical division comprises a corresponding number of subdivisions bearing the characters 0 to 9, inclusive. The different letters and numerals shown in Fig. III are preferably printed on the pages of the book for the purpose of identifying the different divisions and subdivisions. The different subdivisions designated 1 to 9 are preferably indicated by numeral tabs extending from the pages as shown in Figs. I and II.

Each of the subdivisions (0 to 9) is divided into a series of individual entry sections *a*, one of which is surrounded by a dotted line in Fig. I. This dotted line does not actually appear upon the book; it is merely shown in Fig. I for the purpose of pointing out one of the elements which I term "entry sections." Each entry section $a$ consists of a heading $b$ indicating the name of a railroad company and columns $c$ associated with said heading, arranged to receive car numbers and other data as will be afterward described. The entry section surrounded by dotted lines in Fig. I is provided with the heading APH, and this particular entry section forms part of the subdivision A0 which is indicated by the characters A0 at the upper right hand corner of Fig. I. Fig. I also shows that the subdivision A0 includes a series of individual entry sections having the headings A&V, AA, AGS, AWP, APH, ART, and Miscellaneous, the object being to include the names or initials of all of the important foreign roads beginning with "A", together with a miscellaneous entry section $a'$ for the unimportant roads. These headings and entry sections are also present on each of the subdivisions A1 to A9, inclusive, so that the initials of each foreign road appears at ten different places in the book: for example, Fig. I shows an entry section $a$ containing APH in subdivision A0, Fig. II shows an entry section $a$ containing APH in subdivision A1, and it will be understood that each of the subdivisions A0 to A9 includes an entry section containing APH as well as all of the other entry sections shown in Fig. I.

The name of the car owner and the number of the car constitute a key for determining the precise location of the entries relating to a particular car. The alphabetical division is instantly determined by the initial letter of the name of the foreign road, and the precise subdivision is determined by the last character of the car number. To illustrate this—car number 5091 owned by APH will be entered in alphabetical division A, subdivision A1 and entry section APH. The alphabetical division A is determined by the first letter in APH, and although the division A comprises ten subdivisions, the exact subdivision (A1) is quickly determined by the car number 5091, which ends with "1." Therefore, it will be readily ascertained that a record of APH car 5091 will be found in subdivision A1 and the particular entry section will bear the heading APH. In accordance with this system, a record of car number 5090, owned by APH, will be entered in subdivision A0, as shown in Fig. I, for the reason that the owner's name begins with A and the car number ends with 0.

In making an original entry relating to APH car 5091, the clerk turns to entry section APH, under subdivision A1 and writes "509" in the "number" column as shown in Fig. IV. This entry placed before the numeral 1 will read 5091, the numerals 1 being printed on the page to avoid the labor of writing the terminal number of each entry in the "number" columns. Each of the "number" columns is preferably provided with a row of printed characters indicating the last character of the numbers to be entered therein.

The entry "C", at the right hand side of 5091 in Fig. IV, is a symbol indicating the name of the railroad from which APH car 5091 was received. The entry 9—21—14, immediately below the symbol C, indicates the date on which the car was received. The entry X, in Fig. IV, is a symbol indicating the name of the railroad to which the car was delivered, and 9—23—14, immediately below X, indicates the date of delivery. If APH car 5091 is again received by the railroad company the clerk knowing that the entry must be made in entry section APH of subdivision A1, will observe that 5091 has already been entered at this point, and the next succeeding entry will be made as indicated at L, Fig. IV. L is a symbol indicating the name of a railroad from which the car was received, and 10—14—14 indicates the date of receipt. According to the record shown in Fig. IV, APH car 5091 is in possession of the railroad company. The date of receipt 10—14—14 is shown, but there is no entry indicating a delivery of the car to a connecting line.

The main advantage derived from my book is a decided saving of time and labor in making the entries at a particular point, and in searching through the book to find the record of a particular car. From the foregoing description it will be apparent that these advantages are gained by dividing the book into alphabetical divisions each of which comprises ten subdivisions designated 0 to 9, inclusive; each of said subdivisions being divided into entry sections having columns and headings which correspond to the columns and headings of the remaining nine subdivisions under the same alphabetical division.

I claim:—

A record book of the character described having a series of pages arranged in alphabetical divisions, each alphabetical division comprising ten subdivisions designated 0 to 9 inclusive, each of said subdivisions having a series of individual entry sections, and each of said entry sections having a heading indicating the name of a railroad company, a column opposite said heading, adapted to receive a car number, each entry section also having subdivided columns appropriately designated to receive entries indicating the dates of receipt and delivery of different cars together with entries indicating the names of the companies from which the cars were received and to which they were delivered; the entry sections of each subdivision being provided with headings and columns which correspond to the headings and columns of the remaining nine subdivisions in the same alphabetical division.

GEO. CHRISTESON.

In the presence of—
E. K. CLARK,
A. J. McCAULEY.